(12) United States Patent  
Hewson et al.

(10) Patent No.: US 9,391,412 B2  
(45) Date of Patent: Jul. 12, 2016

(54) 12 VOLT ELECTRICAL OUTLET ASSEMBLY AND METHOD OF INSTALLING THE SAME

(71) Applicant: ENVIRAGEN LLC, Rosendale, NY (US)

(72) Inventors: Alan Hewson, Saugerties, NY (US); David Delardi, Rosendale, NY (US)

(73) Assignee: ENVIRAGEN LLC, Rosendale, NY (US)

( * ) Notice: Subject to any disclaimer, the term of this patent is extended or adjusted under 35 U.S.C. 154(b) by 54 days.

(21) Appl. No.: 14/292,094

(22) Filed: May 30, 2014

(65) Prior Publication Data

US 2014/0370746 A1 Dec. 18, 2014

Related U.S. Application Data

(60) Provisional application No. 61/835,277, filed on Jun. 14, 2013.

(51) Int. Cl.
| | |
|---|---|
| *H01R 13/60* | (2006.01) |
| *H01R 25/00* | (2006.01) |
| *H01R 103/00* | (2006.01) |
| *H01R 24/38* | (2011.01) |
| *H02G 3/08* | (2006.01) |

(52) U.S. Cl.
CPC .............. *H01R 25/006* (2013.01); *H01R 24/38* (2013.01); *H01R 2103/00* (2013.01); *H02G 3/086* (2013.01)

(58) Field of Classification Search
CPC ..................................................... H01R 25/006  
USPC ..................................... 439/535, 620.26, 675  
See application file for complete search history.

(56) References Cited

U.S. PATENT DOCUMENTS

| | | | | |
|---|---|---|---|---|
| 4,163,965 | A * | 8/1979 | Misinchuk | H01C 10/46 315/291 |
| 5,372,522 | A * | 12/1994 | Hoeft | H01R 31/06 439/221 |
| 5,563,782 | A | 10/1996 | Chen et al. | |
| 5,751,542 | A | 5/1998 | Holhammar | |
| 5,993,262 | A * | 11/1999 | Kowdynski | H01R 31/06 439/35 |
| 6,362,987 | B1 * | 3/2002 | Yurek | H01R 13/6633 363/146 |

(Continued)

OTHER PUBLICATIONS

International Search Report from corresponding International Patent Application No. PCT/US2014/042087 filed on Jun. 12, 2014. Mailing Date: Oct. 29, 2014.

(Continued)

*Primary Examiner* — Abdullah Riyami  
*Assistant Examiner* — Thang Nguyen  
(74) *Attorney, Agent, or Firm* — Lucas & Mercanti, LLP

(57) ABSTRACT

A twelve volt electrical outlet assembly comprises an outlet cover comprising first and second openings, first and second outlet sockets adapted to fit in the first and second openings, and a rear housing. The outlet assembly also comprises a first contact disposed on an interior of the rear housing, a second contact coupled to the first and second outlet sockets, a positive insulated conductive wire associated with a 110 volt dual electrical junction box, the positive insulated conductive wire being coupled to the first contact, and a negative insulated conductive wire coupled to the second contact. The positive insulated conductive may be soldered to the first contact, and the negative insulated conductive wire may be soldered to the second contact. A method of installing the twelve volt electrical outlet assembly in a house is also provided.

8 Claims, 17 Drawing Sheets

(56) References Cited

U.S. PATENT DOCUMENTS

| | | | | |
|---|---|---|---|---|
| 6,576,837 | B1* | 6/2003 | Pimentel | H02G 3/14 |
| | | | | 174/58 |
| 8,033,864 | B1* | 10/2011 | Cho | H01R 13/688 |
| | | | | 439/620.26 |
| 2006/0126243 | A1 | 6/2006 | Cheng et al. | |
| 2011/0227535 | A1 | 9/2011 | Caskey et al. | |
| 2012/0231657 | A1* | 9/2012 | Bouse | H02G 3/185 |
| | | | | 439/535 |

OTHER PUBLICATIONS

Written Opinion from corresponding International Patent Application No. PCT/US2014/042087 filed on Jun. 12, 2014. Mailing Date: Oct. 29, 2014.

\* cited by examiner

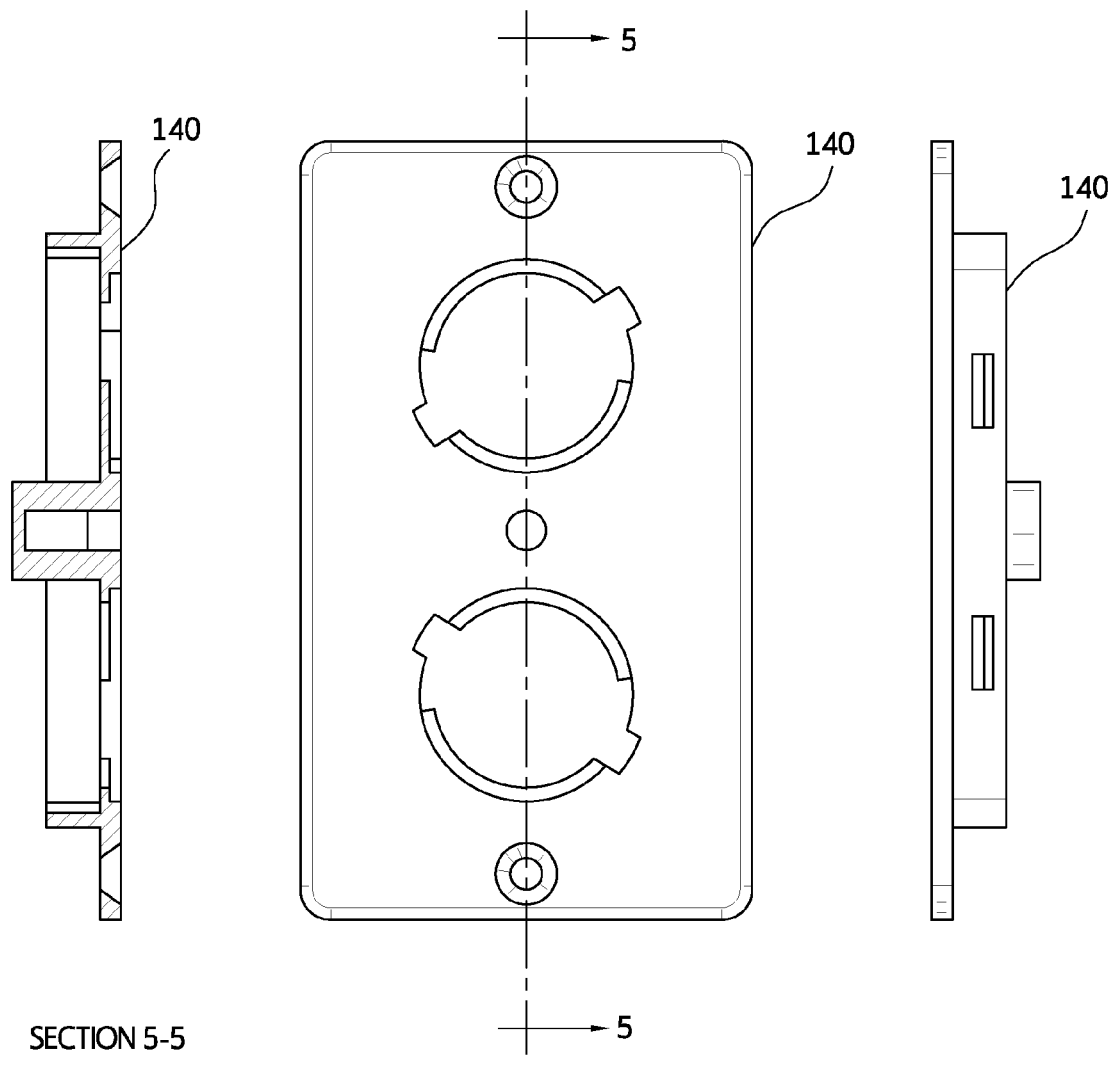

SECTION B-B

12 VOLT ELECTRICAL OUTLET ASSEMBLY AND METHOD OF INSTALLING THE SAME

This application claims the benefit of U.S. Provisional Patent Application No. 61/835,277, filed on Jun. 14, 2013, which is hereby incorporated by reference in its entirety for all purposes.

FIELD OF THE INVENTION

This Invention relates to electrical systems for houses, and more particularly to a 12-volt electrical outlet assembly.

BACKGROUND

In the United States, many houses are wired with a 110-volt electrical system. Electrical outlets (located in walls, etc.) are adapted to provide 110 volts to power lights and other appliances.

Recently, 12-volt devices have been developed which may be powered, for example, using a cigarette lighter in an automobile. Specially designed 12-volt plugs have been developed to fit into an automobile cigarette lighter and provide power to such devices.

SUMMARY OF THE INVENTION

In accordance with an embodiment, a twelve volt electrical outlet assembly comprises an outlet cover comprising first and second openings, first and second outlet sockets adapted to fit in the first and second openings, and a rear housing. The outlet assembly also comprises a first contact disposed on an interior of the rear housing, a second contact coupled to the first and second outlet sockets, a positive insulated conductive wire associated with a 110 volt dual electrical junction box, the positive insulated conductive wire being coupled to the first contact, and a negative insulated conductive wire coupled to the second contact.

In one embodiment, the positive insulated conductive wire is soldered to the first contact, and the negative insulated conductive wire is soldered to the second contact.

In another embodiment, the outlet assembly also includes a fuse disposed in an electrical path between the negative insulated conductive wire and the second contact.

In another embodiment, the positive insulated conductive wire and the negative insulated conductive wire are associated with an industry standard 110 volt dual electrical junction box located in a house.

In another embodiment, the rear housing comprises a hole adapted to receive the positive insulated conductive wire and the negative insulated conductive wire.

In another embodiment, the twelve volt electrical outlet assembly further comprises two dress clips and a front plate.

In another embodiment, each of the outlet sockets is approximately 1.23 inches long and has a diameter of approximately 0.835 inches.

In another embodiment, each outlet socket comprises steel having a thickness of approximately 0.020 inch.

In another embodiment, each of the first and second contacts comprises first and a second end flanges, a central raised section, and a central flange extending from the central raised section, wherein an angle between a first plane associated with the central raised section and a second plane associated with the central flange is between 30 degrees and 90 degrees, more preferably between 45 degrees and 90 degrees.

In accordance with another embodiment, a method of installing a twelve volt electrical outlet assembly is provided.

A positive insulated conductive wire and a negative insulated conductive wire associated with an industry standard 110 volt dual electrical junction box are inserted into an electrical outlet assembly that comprises first and second twelve volt direct current outlet sockets. The positive insulated conductive wire is coupled to a first contact in the electrical outlet assembly, the first contact being adapted to receive a contact of a plug inserted into any one of the first twelve volt direct current outlet socket and the second twelve volt direct current outlet socket. The negative insulated conductive wire is coupled to a second contact which is in contact with first and second twelve volt direct current outlet sockets.

In one embodiment, the positive insulated conductive wire is soldered to the first contact. The negative insulated conductive wire soldered to the second contact.

In another embodiment, the negative insulated conductive wire is coupled to a fuse, and the fuse is coupled to the second contact which is in contact with first and second twelve volt direct current outlet sockets.

These and other advantages of the present disclosure will be apparent to those of ordinary skill in the art by reference to the following Detailed Description and the accompanying drawings.

BRIEF DESCRIPTION OF THE DRAWINGS

FIGS. 5A and 5B show a top view and a side view of a front plate in accordance with an embodiment;

FIG. 5C shows a cross section of a front plate in accordance with an embodiment;

DETAILED DESCRIPTION OF THE INVENTION

In accordance with an embodiment, a twelve volt electrical outlet assembly comprises an outlet cover comprising first and second openings, first and second outlet sockets adapted to fit in the first and second openings, and a rear housing. The outlet assembly also comprises a first contact disposed on an interior of the rear housing, a second contact coupled to the first and second outlet sockets, a positive insulated conductive wire associated with a 110 volt dual electrical junction box, the positive insulated conductive wire being coupled to the first contact, and a negative insulated conductive wire coupled to the second contact. The positive insulated conductive wire may be soldered to the first contact, and the negative insulated conductive wire may be soldered to the second contact. A method of installing the twelve volt electrical outlet assembly in a house is also provided.

Figure 1:
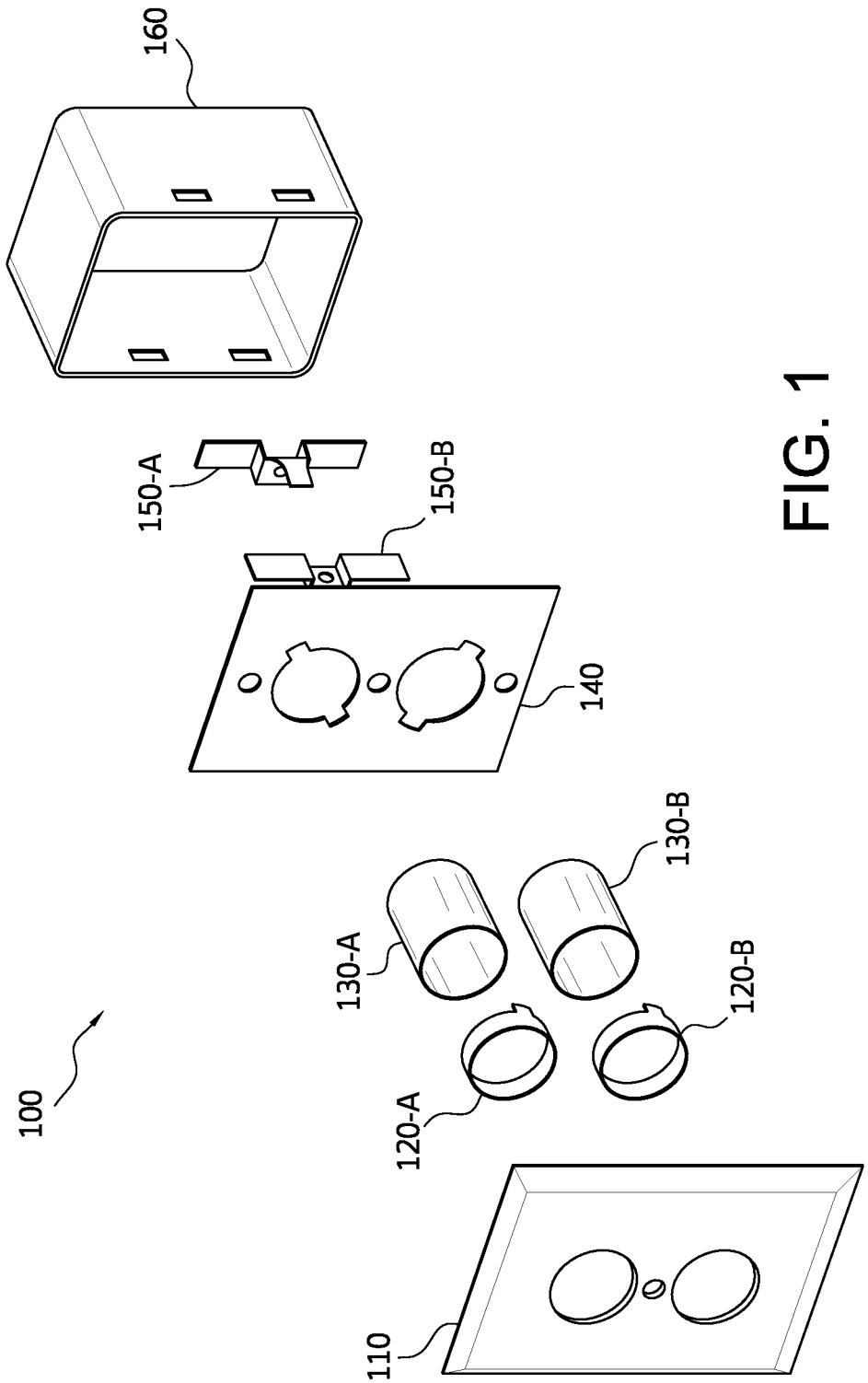
FIG. 1 shows an electrical outlet assembly in accordance with an embodiment.

FIG. 1 shows a 12-volt electrical outlet assembly in accordance with an embodiment. Outlet assembly 100 comprises an outlet cover 110, two dress clips 120-A, 120-B, two outlet sockets 130-A, 130-B, a front plate 140, two contacts 150-A, 150-B, and a rear housing 160.

For convenience, the term "dress clip 120" is used herein to refer to either dress clip 120-A or dress clip 120-B.

Similarly, the term "outlet socket 130" is used herein to refer to either outlet socket 130-A or outlet socket 130-B.

Similarly, the term "contact 150" is used herein to refer to either contact 150-A or contact 150-B.

Figure 2:
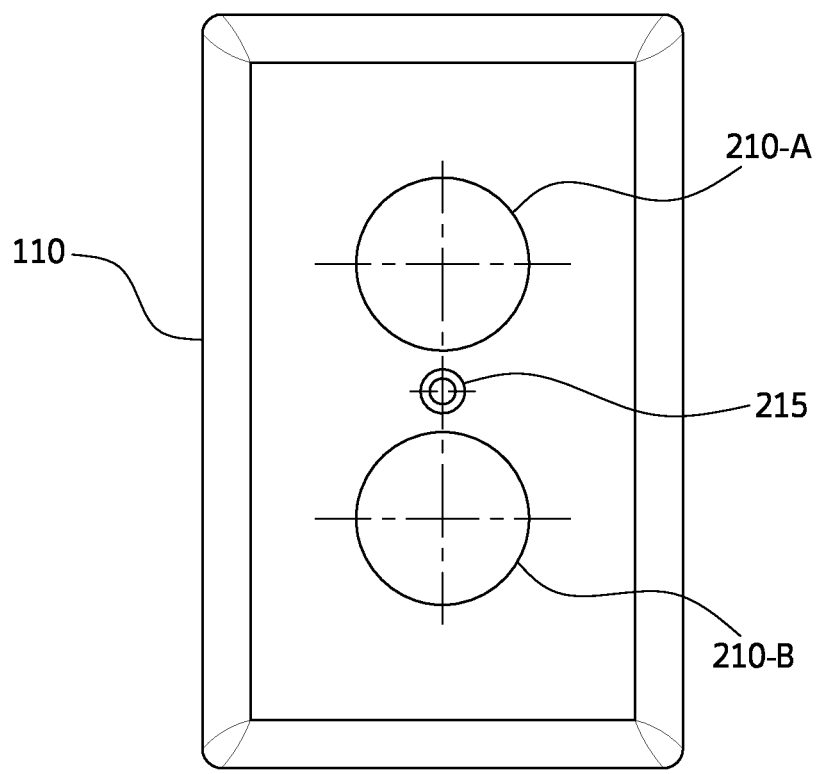
FIG. 2 shows an outlet cover in accordance with an embodiment.

FIG. 2 shows outlet cover 110 in accordance with an embodiment. Outlet cover 110 includes two openings 210-A, 210-B and hole 215.

Figure 3A:
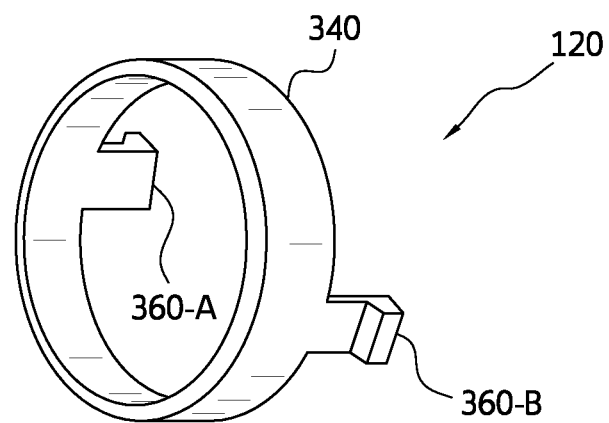
FIGS. 3A-3C show a perspective view, a top view, and a side view of a dress clip, respectively, in accordance with an embodiment.
Figure 3B:
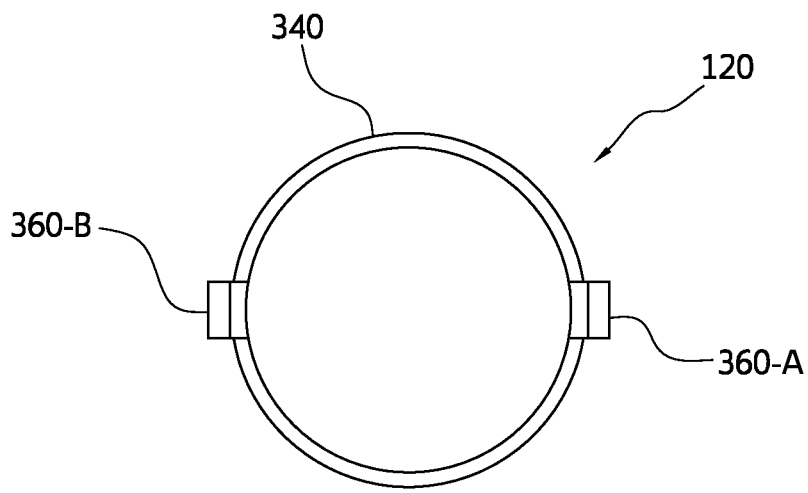
Figure 3C:
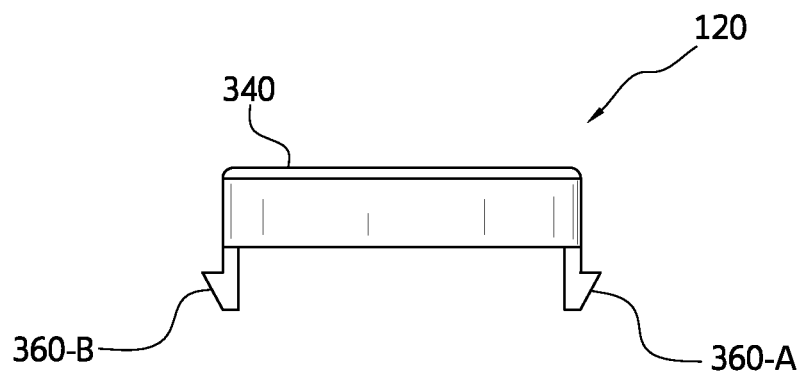

FIGS. 3A-3C show a perspective view, a top view, and a side view of a dress clip 120, respectively, in accordance with an embodiment. Dress clip 120 comprises a ring portion 340 and two flanges 360-A, 360-B.

Figure 4A:
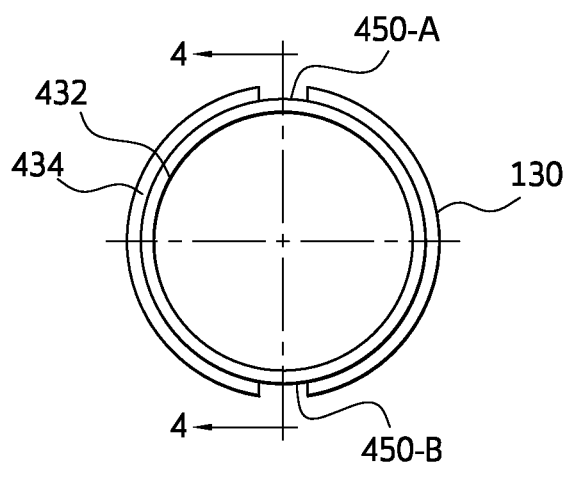
FIGS. 4A and 4B show a top view and a side view of an outlet socket, respectively, in accordance with an embodiment.
Figure 4C:
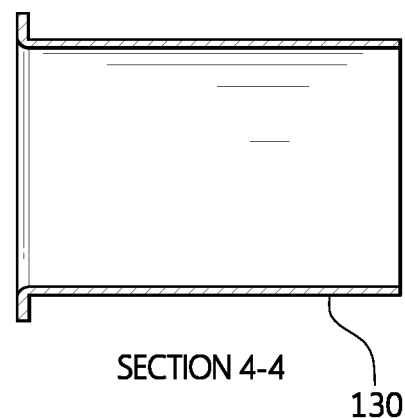
FIG. 4C shows a cross section of an outlet socket in accordance with an embodiment.
Figure 4B:
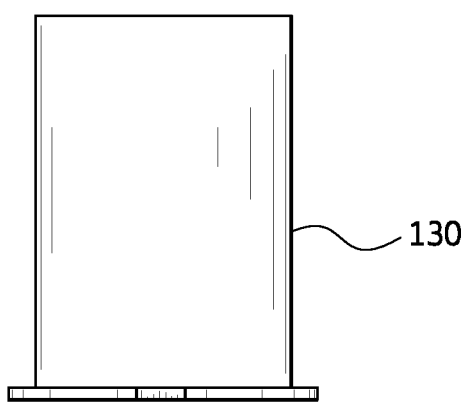

FIGS. 4A and 4B show a top view and a side view of an outlet socket 130, respectively, in accordance with an embodiment. FIG. 4C shows a cross section of outlet socket 130 along line 4-4 in accordance with an embodiment.

Outlet socket 130 comprises a twelve volt direct current outlet socket. Structurally, outlet socket 130 comprises a cylindrical structure with a first open end and a second open end. Each outlet 130 is adapted to fit through one of openings 210 in outlet cover 110. In the illustrative embodiment, the cylindrical portion of outlet socket 130 comprises an inner layer 432 and an outer layer 434. Outlet socket 130 further comprises notches 450-A, 450-B in outer layer 434, running longitudinally along opposite sides of the cylindrical structure.

In an illustrative embodiment, outlet socket 130 is 1.23 inches long and has a diameter of 0.835 inches. Notches 450 are 0.180 inches wide. Other dimensions may be used.

In one embodiment, outlet socket comprises 0.020 inch thick steel. Other materials may be used.

Accordingly each outlet socket 130 may receive a plug of a 12 volt appliance.

FIGS. 5A and 5B show a top view and a side view of front plate 140 in accordance with an embodiment. FIG. 5C shows a cross section of front plate 140 along line 5-5 in accordance with an embodiment.

Figure 6A:
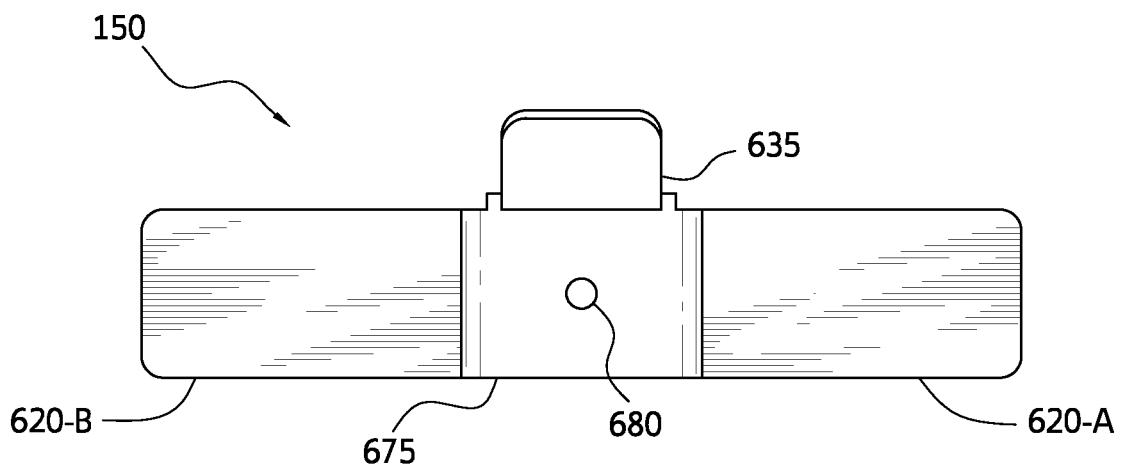
FIG. 6A shows a top view of a contact in accordance with an embodiment.
Figure 6B:
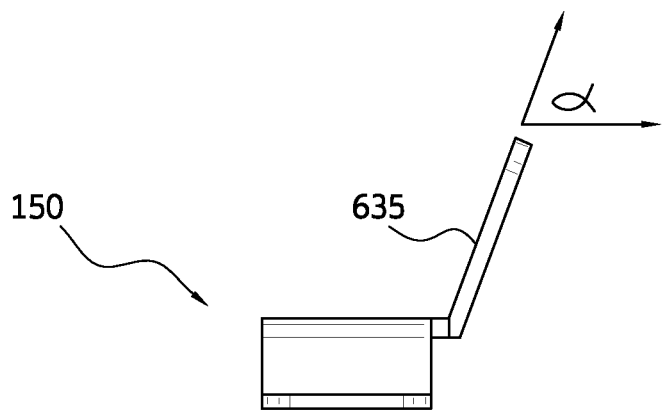
FIGS. 6B-6C show an end view and a side view of a contact, respectively, in accordance with an embodiment.
Figure 6C:
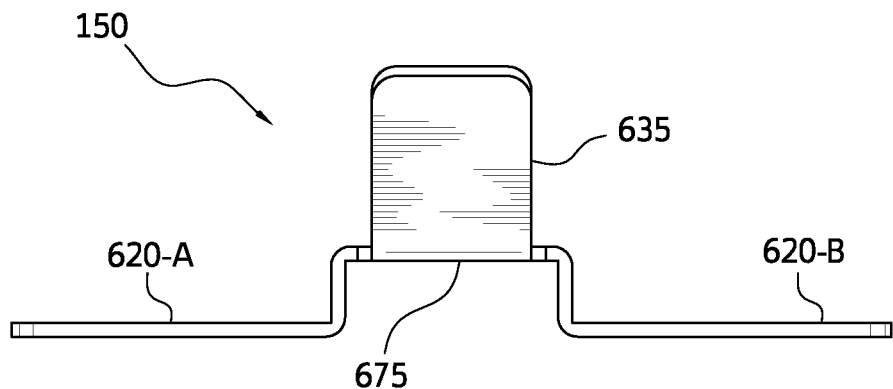

FIG. 6A shows a top view of contact 150 in accordance with an embodiment. FIGS. 6B-6C show an end view and a side view of contact 150, respectively, in accordance with an embodiment. Contact 150 comprises first and second end flanges 620-A, 620-B. Contact 150 also comprises a central raised section 675 to which is connected a central flange 635. Central flange 635 extends from central raised section 675; an angle α between a first plane associated with the central raised section 675 and a second plane associated with the central flange 635 is between 30 degrees and 90 degrees, more preferably between 45 degrees and 90 degrees. A hole 680 is disposed in central raised section 675.

In an illustrative embodiment, contact 150 is about 2.125 inches long (from end to end). First and second end flanges 620 are about 0.325 inches wide. Central raised section is about 0.460 inches long and 0.325 inches wide. Central flange 635 is about 0.300 inches long and 0.250 inches wide. Hole 680 is about 0.089 inches in diameter.

In the illustrative embodiment, contact 150-A is disposed in the interior of rear housing 160, behind outlet sockets 130. Accordingly, contact 150-A is disposed and adapted to receive a contact of a plug inserted into either outlet socket 130-A or outlet socket 130-B.

Figures 7A, 7B, 7C, 7E:
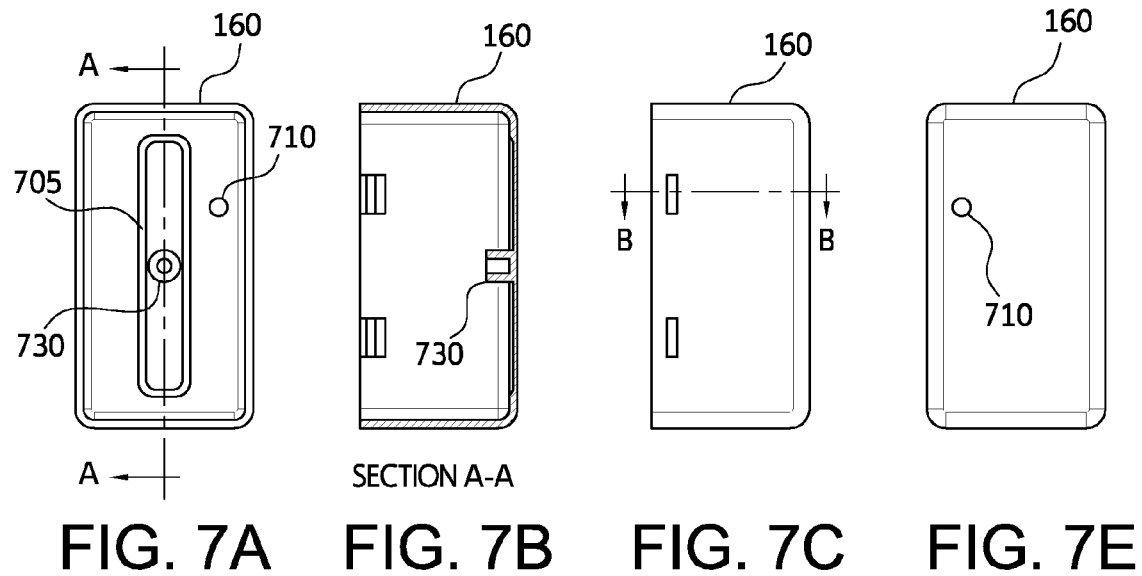
FIG. 7A shows a top view of a rear housing in accordance with an embodiment.
FIG. 7B shows a cross section of a rear housing in accordance with an embodiment.
FIG. 7C shows a side view of a rear housing in accordance with an embodiment.
FIG. 7E shows a rear view of rear housing in accordance with an embodiment.

FIG. 7A shows a top view of rear housing 160 in accordance with an embodiment. A region 705 adapted to hold contact 150-A is visible. A structure 730 is disposed centrally on the interior of the back side of rear housing 160; structure 730 is adapted to receive a screw or other fastener to hold contact 150-A in place. The back side of rear housing 160 also comprises a hole 710 through which wiring can pass.

Figure 7D:
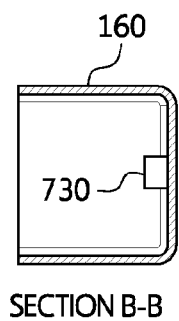
FIG. 7D shows a cross section of a rear housing in accordance with an embodiment.

FIG. 7B shows a cross section of rear housing along line A-A in accordance with an embodiment. FIG. 7C shows a side view of rear housing 160 in accordance with an embodiment. FIG. 7D shows a cross section of rear housing 160 along line B-B in accordance with an embodiment. FIG. 7E shows a rear view of rear housing 160 in accordance with an embodiment. Hole 710 is visible from the rear of housing 160.

Figure 8:
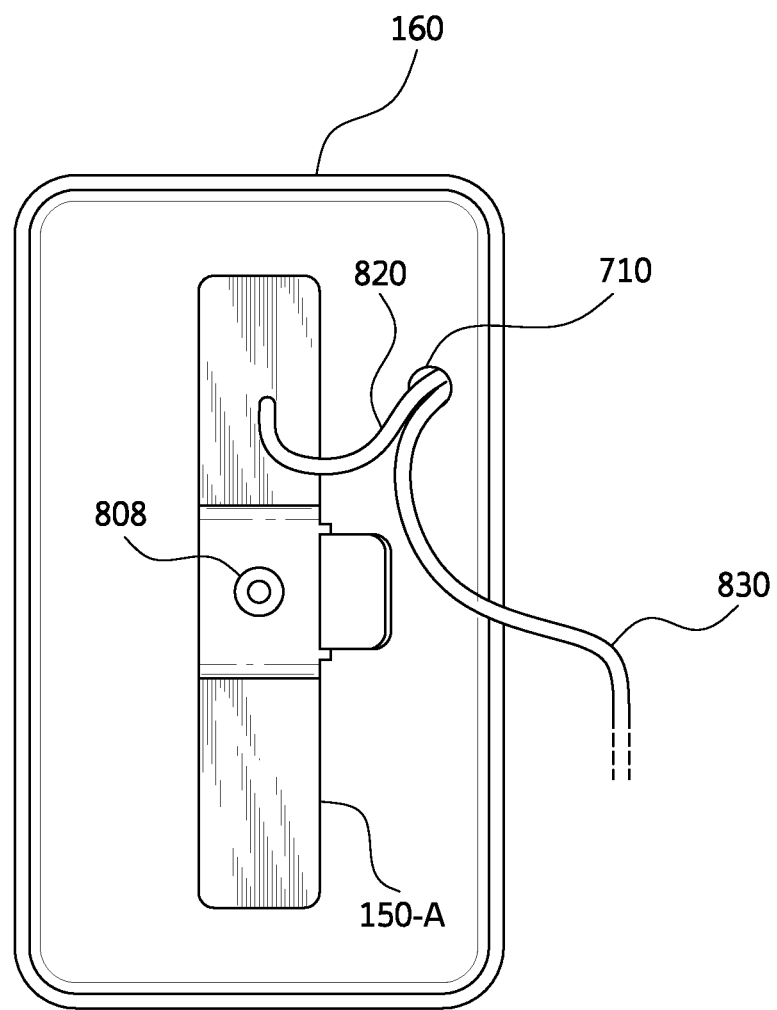
FIG. 8 shows a top view of a rear housing in accordance with an embodiment.

FIG. 8 shows a top view of rear housing 160 with contact 150-A and wiring in place in accordance with an embodiment. Contact 150-A is held in place by a screw 808. As shown in FIG. 8, a positive insulated conductive wire 820 passes through hole 710 and is coupled (soldered) to contact 150-A. A negative insulated conductive wire 830 passes through hole 710; as is shown in FIG. 9, negative insulated conductive wire 830 is coupled (soldered) to (second) contact 710-B.

Figure 9:
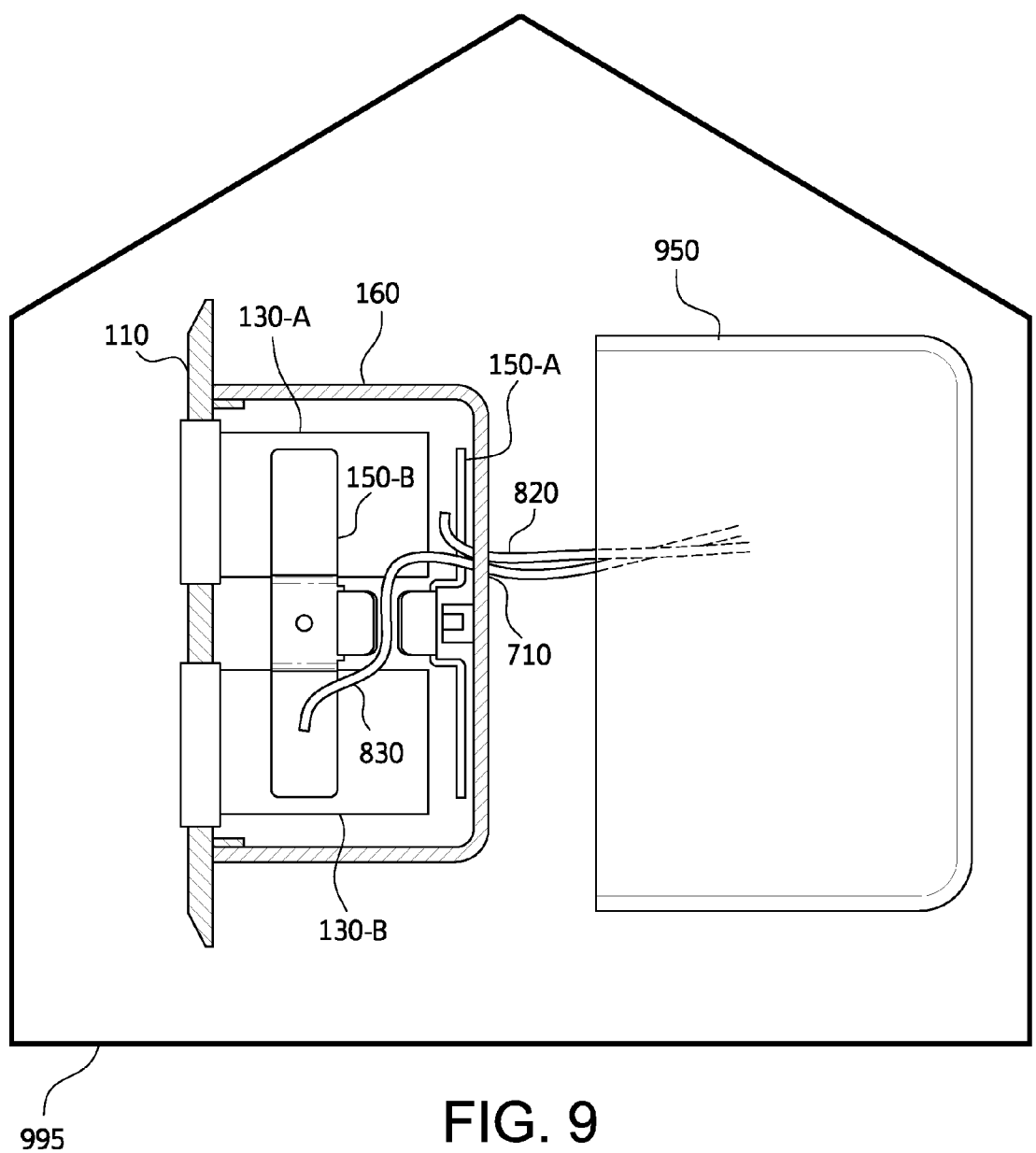
FIG. 9 shows an electrical outlet assembly with wiring in accordance with an embodiment.

FIG. 9 shows electrical outlet assembly 100 with wiring in accordance with an embodiment. FIG. 9 also shows an industry standard 110 volt dual electrical junction box 950 (side view). Contact 150-A is fixed to rear housing 160. Contact 150-B is soldered to outlet sockets 130-A, 130-B. Positive insulated conductive wire 820 and negative insulated conductive wire 830 originate from (or are associated with) junction box 950 and are threaded into electrical outlet assembly 100 through hole 710 of rear housing 160. As discussed above, positive insulated conductive wire 820 is soldered to (first) contact 150-A; negative insulated conductive wire 830 is soldered to (second) contact 710-B.

After the wiring is in place as shown in FIG. 9, the components of outlet assembly 100 may be assembled according to the configuration shown in FIG. 1 and installed in the wall of a house, in a known manner. FIG. 9 shows a house 995 for purposes of illustration.

Figure 10:
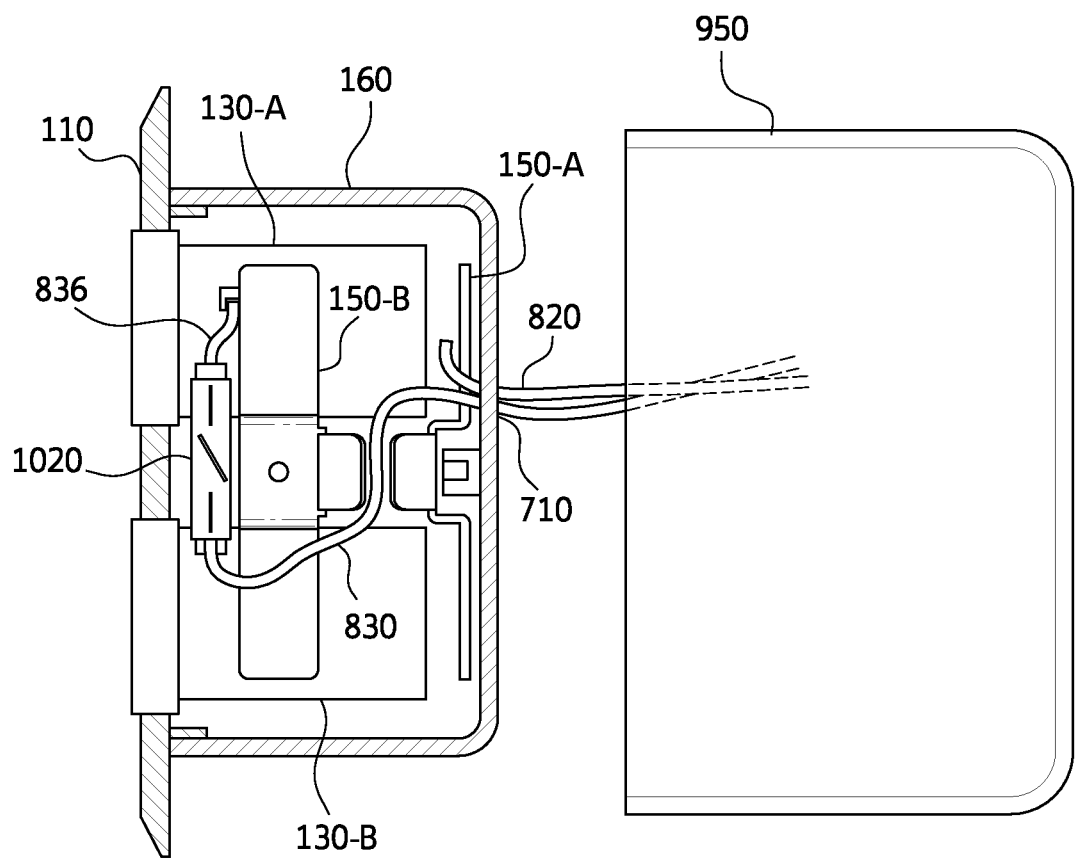
FIG. 10 shows an electrical outlet assembly with wiring in accordance with another embodiment.

FIG. 10 shows electrical outlet assembly 100 with wiring in accordance with another embodiment. FIG. 10 also shows industry standard 110 volt dual electrical junction box 950 (side view). Positive insulated conductive wire 820 and negative insulated conductive 830 originate from junction box 950 and are threaded into electrical outlet assembly 100 through hole 710 of rear housing 160. Positive insulated conductive wire 820 is soldered to (first) contact 150-A. Negative insulated conductive wire 830 is coupled to a fuse 1020 which is coupled to (second) contact 710-B by a wire 836. Wire 836 may be soldered to (second) contact 150-B, for example. Thus, outlet assembly 100 may be retrofitted to an existing 110 volt dual electrical junction box in an existing house, for example.

Figure 11A:
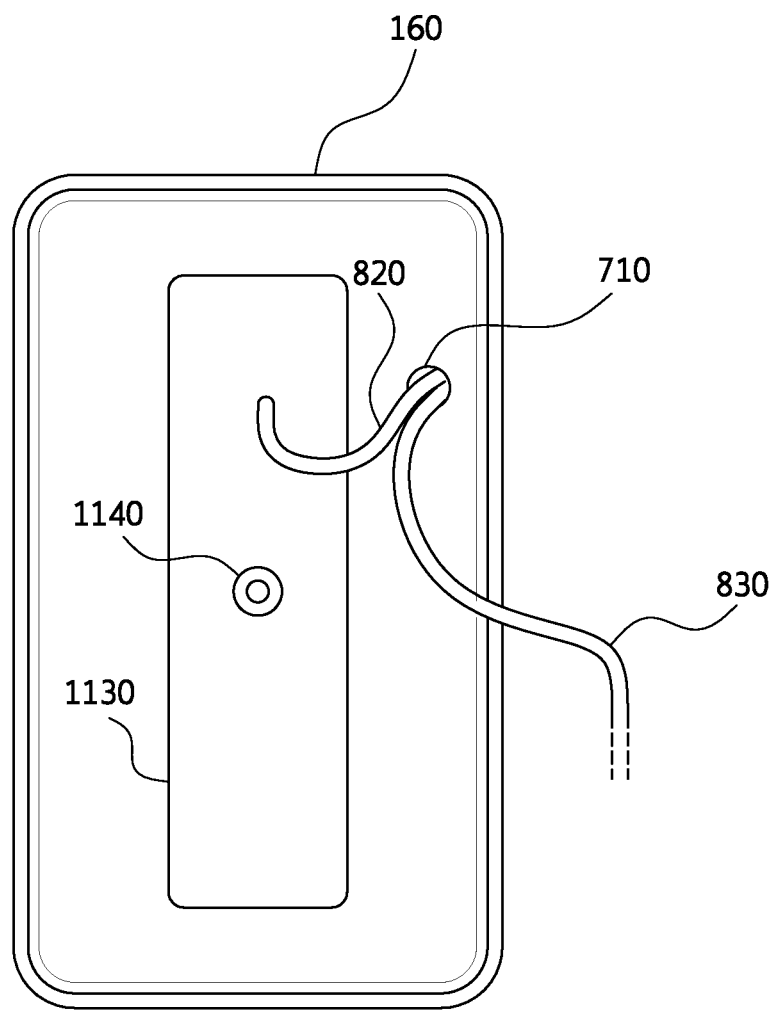
FIG. 11A shows a top view of a rear housing in accordance with another embodiment.

FIG. 11A shows a top view of rear housing 160 in accordance with another embodiment. A conductive metal plate 1130 is attached to the interior of rear housing 160, for example, by a screw 1140. Positive insulated conductive wire 820 is soldered to metal plate 1130.

Figure 11B:
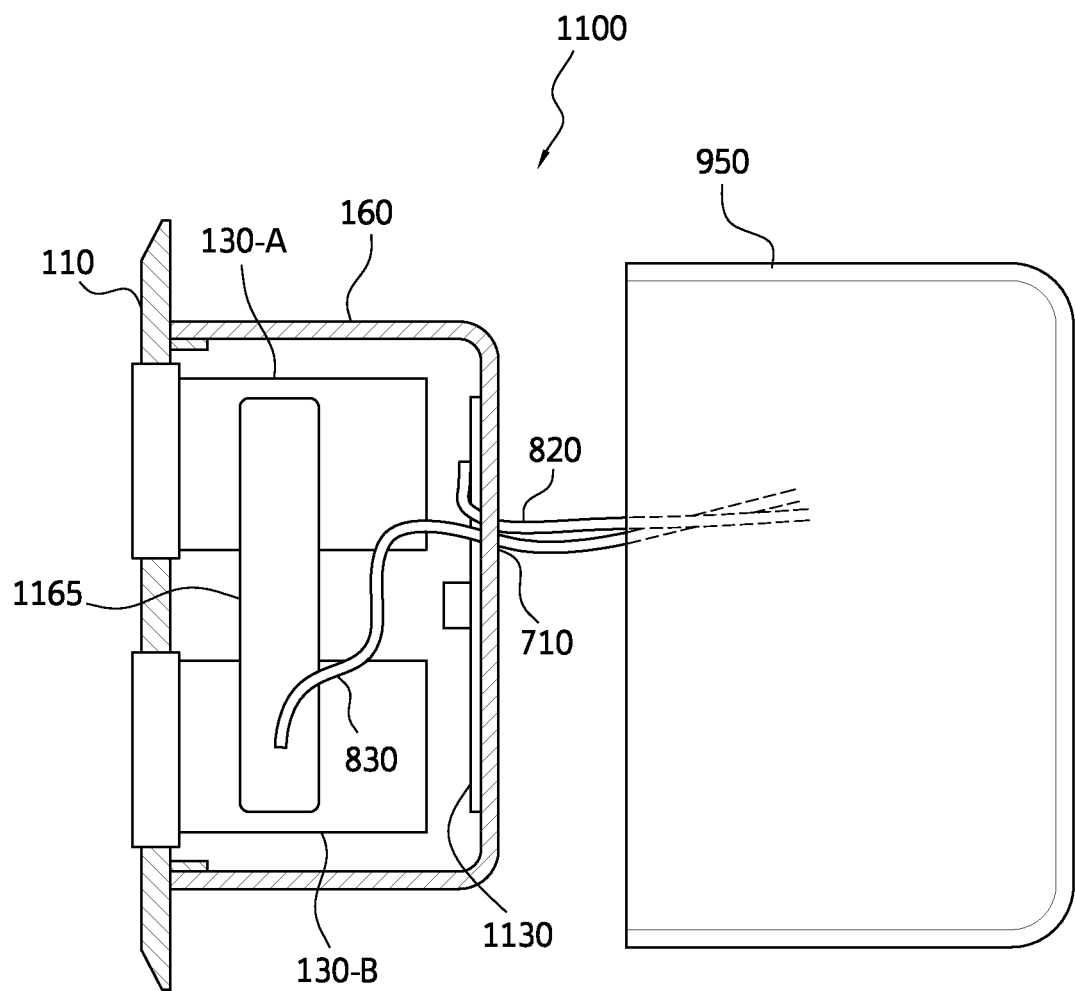
FIG. 11B shows an electrical outlet assembly in accordance with another embodiment.

FIG. 11B shows an electrical outlet assembly 1100 in accordance with another embodiment. Industry standard 110 volt dual electrical junction box 950 is also shown. As described above, conductive metal plate 1130 is attached to the interior of rear housing 160. A second conductive metal plate 1165 is soldered to outlet sockets 130-A, 130-B. Positive insulated conductive wire 820 is soldered to conductive metal plate 1130. Negative insulated conductive wire 830 is soldered to (second) metal plate 1165.

Figure 11C:
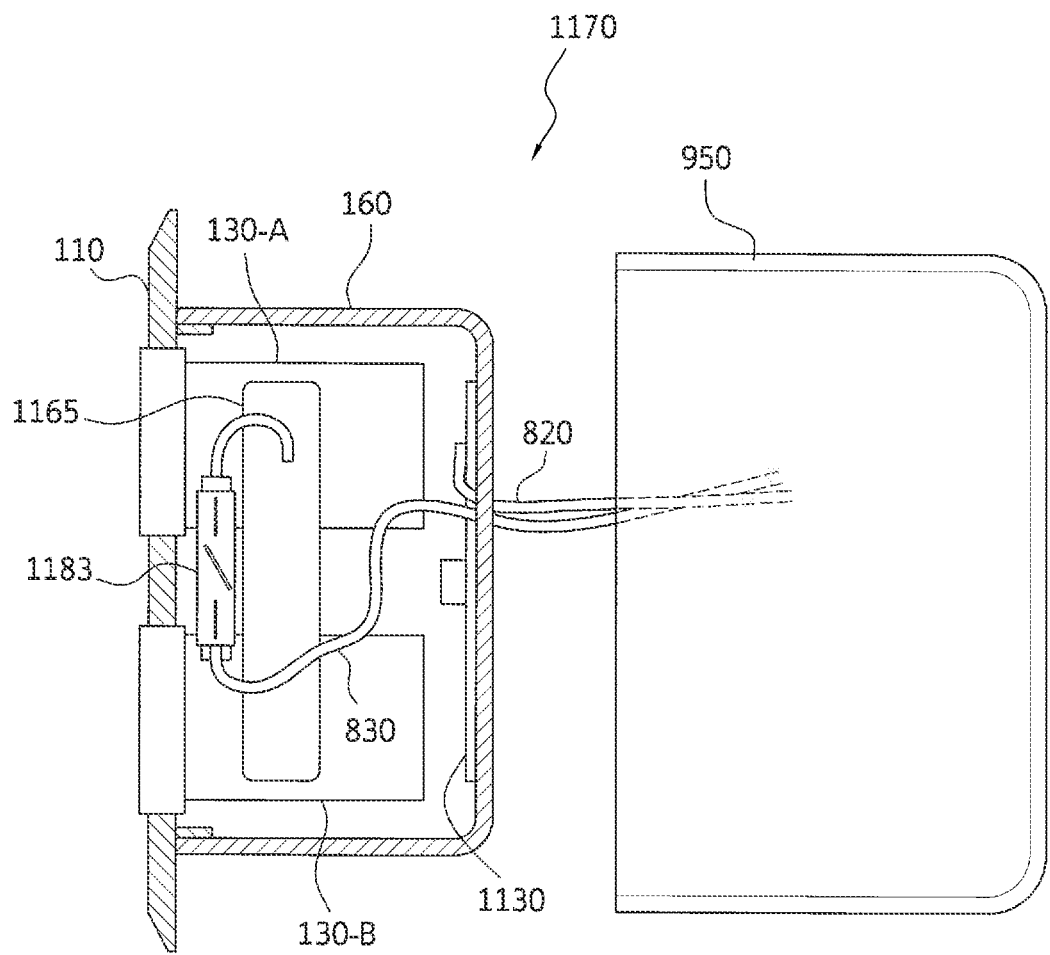
FIG. 11C shows an electrical outlet assembly in accordance with an embodiment.

FIG. 11C shows an electrical outlet assembly 1170 in accordance with another embodiment. Industry standard 110 volt dual electrical junction box 950 is also shown. Conductive metal plate 1130 is attached to the interior of rear housing 160. Second conductive metal plate 1165 is soldered to outlet sockets 130-A, 130-B. Positive insulated conductive wire 820 is soldered to conductive metal plate 1130. Negative insulated conductive wire 830 is coupled to a fuse 1183, which is coupled to (second) metal plate 1165.

Figure 12:
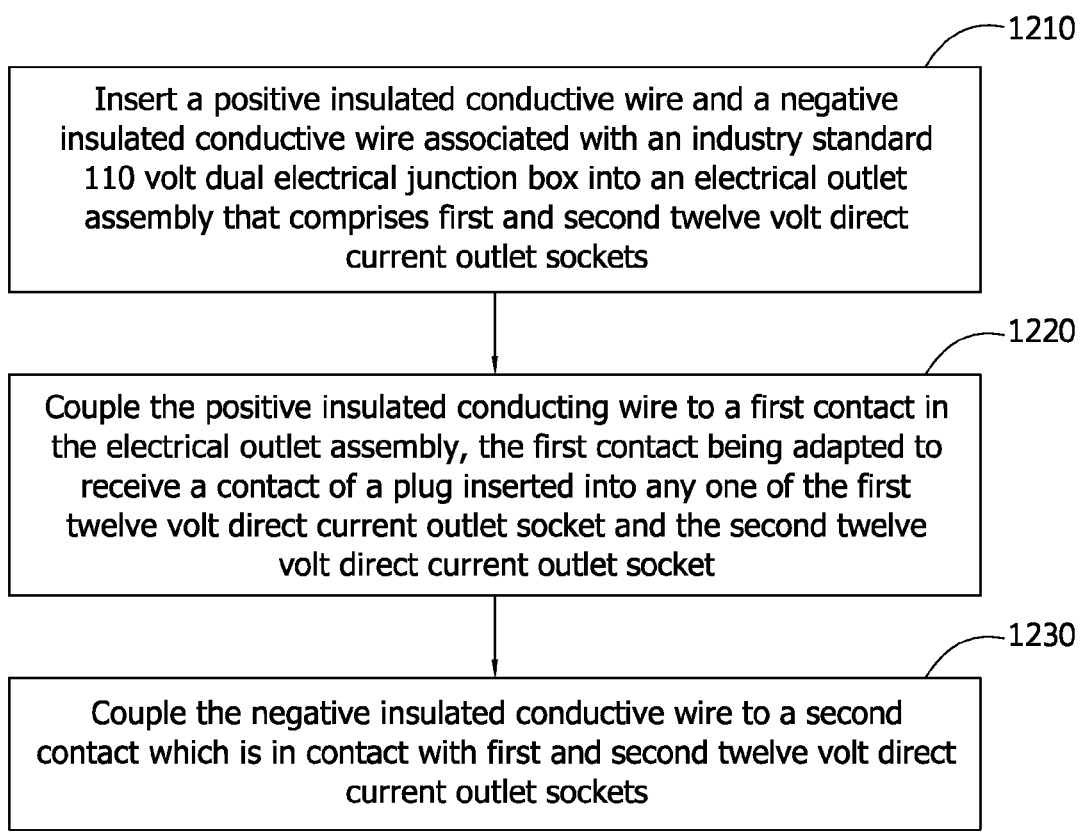
FIG. 12 is a flowchart of a method of wiring an electrical outlet assembly in accordance with an embodiment.

FIG. 12 is a flowchart of a method of wiring an electrical outlet assembly accordance with an embodiment. The electrical outlet assembly may be installed in a house, for example. At step 1210, a positive insulated conductive wire and a negative insulated conductive wire associated with an industry standard 110 volt dual electrical junction box 950 are inserted into an electrical outlet assembly that comprises first and second twelve volt direct current outlet sockets. In the illustrative embodiment, positive insulated conductive wire 820 and negative insulated conductive wire 830 are inserted through hole 710 of rear housing 160. At step 1220, the positive insulated conductive wire s coupled to a first contact in the electrical outlet assembly, the first contact being adapted to receive a contact of a plug inserted into any one of the first twelve volt direct current outlet socket and the second twelve volt direct current outlet socket. At step 1230, the negative insulated conductive wire is coupled to a second contact which is in contact with first and second twelve volt direct current outlet sockets. In an illustrative embodiment discussed above, positive insulated conductive wire 820 is soldered to (first) contact 150-A, and negative insulated conductive wire 830 is soldered to (second) contact 710-B. The outlet assembly may then be assembled and installed in a wall of a house in a known manner.

Figure 13:
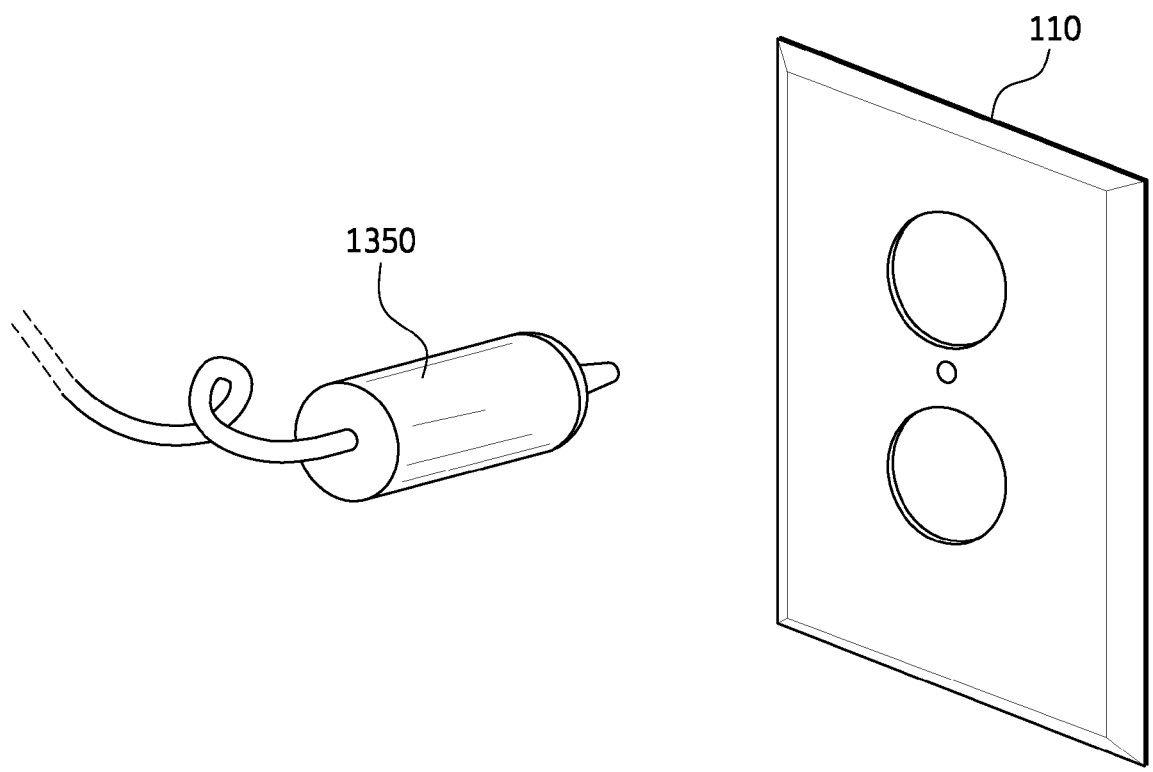
FIG. 13 shows an electrical outlet assembly installed in a wall and a twelve volt plug of an appliance in accordance with an embodiment.

FIG. 13 shows an electrical outlet assembly 110 installed in a wall of a house. A 12-volt plug 1350 may be inserted an opening of into electrical outlet assembly 110 in order to power a 12-volt appliance or device (not shown).

Figure 14F:
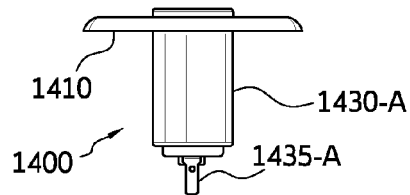
FIGS. 14A-14G show an electrical outlet assembly in accordance with another embodiment.
Figure 14B:
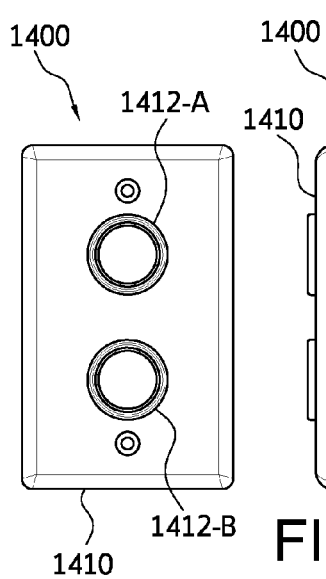
Figures 14C, 14D, 14E:
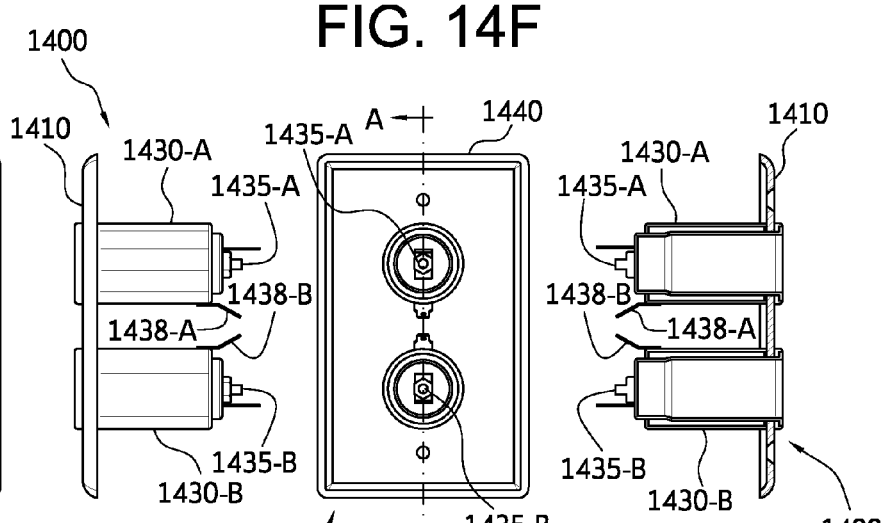
Figure 14A:
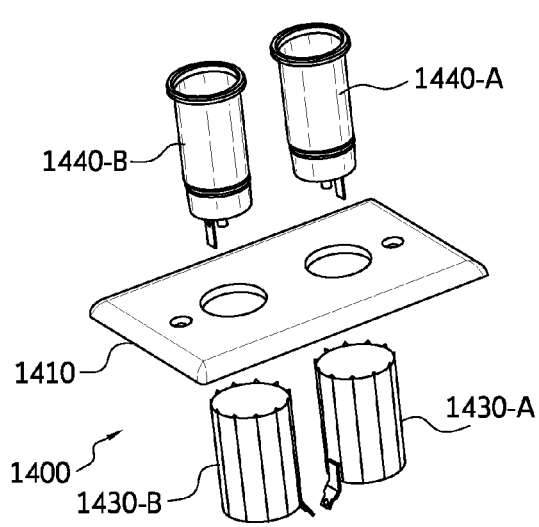

FIGS. 14A-14G illustrate a 12-volt electrical outlet assembly in accordance with another embodiment. FIG. 14A shows components of electrical outlet assembly 1400. Outlet assembly 1400 comprises an outlet cover 1410, two metal casings 1430-A, 1430-B, and two outlet sockets 1440-A, 1440-B adapted to fit into metal casings 1430-A, 1430-B.

FIG. 14B shows a front view of electrical outlet assembly 1400. Outlet cover 1410 includes two openings 1412-A, 1412-B.

FIG. 14C shows a side view of electrical outlet assembly 1400. Outlet sockets 1440-A, 1440-B are installed in metal casings 1430-A, 1430-B, respectively, which are in turn installed in openings 1412-A, 1412-B, respectively. Each outlet socket 1440 comprises a contact 1435 projecting from the end of socket 1440. Thus, outlet socket 1440-A comprises a contact 1435-A, and outlet socket 1440-B comprises a contact 1435-B. Each metal casing 1430 comprises a flange 1438. Thus, metal casing 1430-A comprises a flange 1438-A protruding from the end of the metal casing 1430-A, and metal casing 1430-B comprises a flange 1438-B protruding from the end of the casing 1430-B.

Figure 14G:
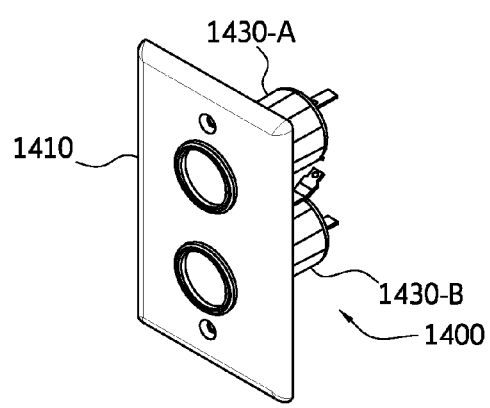

FIG. 14D shows a rear view of electrical outlet assembly 1400. FIG. 14E shows a cross-section of electrical outlet assembly 1400 along line A-A (of FIG. 14D). FIG. 14F shows another side view of outlet assembly 1400. FIG. 14G shows a perspective view of outlet assembly 1400.

In accordance with an embodiment, a positive insulated conductive wire and a negative insulated conductive wire associated with an industry standard 110 volt dual electrical junction box 950 may be coupled to metal casings 1430-A, 1430-B, in a manner similar to that described above. The outlet assembly 1400 may then be assembled and installed in a wall of a house in a known manner.

Figure 15:
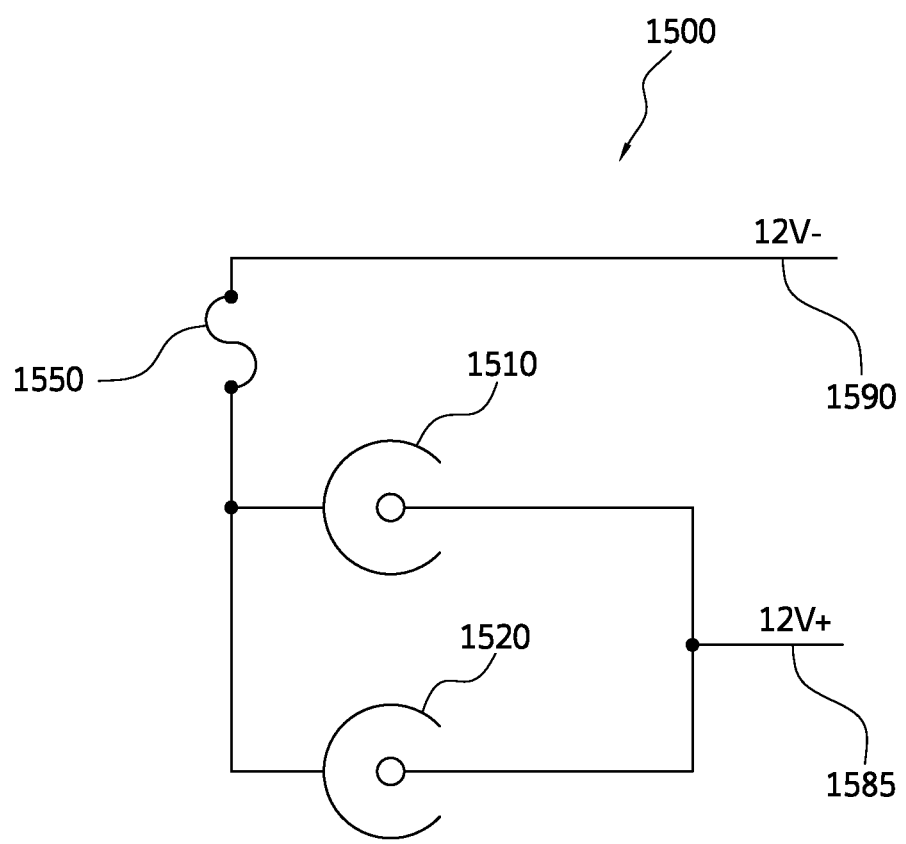
FIG. 15 shows a circuit diagram of a circuit used in certain embodiments.

FIG. 15 is a circuit diagram of a circuit 1500 that is used in certain embodiments described herein. Two sockets 1510, 1520 are connected in parallel to a positive 12-volt wire 1585. Sockets 1510, 1520 are connected to a fuse 1550. Fuse 1550 is connected to a negative 12-volt wire 1590.

In another embodiment, a circuit similar to that shown in FIG. 15 but without a fuse may be used.

In other embodiments, an outlet assembly similar to those described above may include more than two outlet sockets. Notably, a twelve volt electrical outlet assembly having two or more outlet sockets, instead of one, is advantageous because it reduces the amount of wiring needed to install a desired number of outlets in a house, and therefore is cost efficient. In contrast, using outlet assemblies having only one socket each would require more wiring and be more costly to place a desired number of outlets.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A twelve volt electrical outlet assembly comprising:
an outlet cover comprising first and second openings;
first and second outlet sockets adapted to fit in the first and second openings;
a rear housing;
a first contact disposed on an interior of the rear housing;
a second contact coupled to the first and second outlet sockets;
a positive insulated conductive wire associated with a 110 volt dual electrical junction box, the positive insulated conductive wire being coupled to the first contact; and
a negative insulated conductive wire coupled to the second contact,
wherein each of the first and second contacts comprises first and second end flanges, a central raised section, and a central flange extending from the central raised section, wherein an angle between a first plane associated with the central raised section and a second plane associated with the central flange is between 30 degrees and 90 degrees, more preferably between 45 degrees and 90 degrees.

2. The twelve volt electrical outlet assembly of claim 1, wherein:
the positive insulated conductive wire is soldered to the first contact; and
the negative insulated conductive wire is soldered to the second contact.

3. The twelve volt electrical outlet assembly of claim 1, further comprising:
a fuse disposed in an electrical path between the negative insulated conductive wire and the second contact.

4. The twelve volt electrical outlet assembly of claim 1, wherein the positive insulated conductive wire and the negative insulated conductive wire are associated with an industry standard 110 volt dual electrical junction box located in a house.

5. The twelve volt electrical outlet assembly of claim 1, wherein the rear housing comprises a hole adapted to receive the positive insulated conductive wire and the negative insulated conductive wire.

6. The twelve volt electrical outlet assembly of claim 1, further comprising:
two dress clips; and
a front plate.

7. The twelve volt electrical outlet assembly of claim 1, wherein:
each of the outlet sockets is approximately 1.23 inches long and has a diameter of 0.835 inches.

8. The twelve volt electrical outlet assembly of claim 7, wherein each outlet socket comprises steel having a thickness of approximately 0.020 inch.

* * * * *